United States Patent
Chon et al.

(10) Patent No.: US 6,793,277 B2
(45) Date of Patent: Sep. 21, 2004

(54) TRANSPARENT ROOF STRUCTURE IN VEHICLE

(76) Inventors: Young-Ill Chon, 106-103 Haenuri-Sunkyung Apartment, 1363-1, Ssangyoung 2-dong, 330-760, Cheonan-si, Chungcheongnam-do (KR); Sang-Wook Chon, 106-103 Haenuri-Sunkyung Apartment, 1363-1, Ssangyoung 2-dong, 330-760, Cheonan-si, Chungcheongnam-do (KR)

( * ) Notice: Subject to any disclaimer, the term of this patent is extended or adjusted under 35 U.S.C. 154(b) by 0 days.

(21) Appl. No.: 10/471,193

(22) PCT Filed: Feb. 18, 2002

(86) PCT No.: PCT/KR02/00241
§ 371 (c)(1),
(2), (4) Date: Sep. 9, 2003

(87) PCT Pub. No.: WO02/072408
PCT Pub. Date: Sep. 19, 2002

(65) Prior Publication Data
US 2004/0075302 A1 Apr. 22, 2004

(30) Foreign Application Priority Data
Mar. 13, 2001 (KR) .......................................... 2001-12837

(51) Int. Cl.[7] ............................................... B62D 25/06
(52) U.S. Cl. ......................................... 296/215; 296/211
(58) Field of Search ............................... 296/210, 211, 296/215

(56) References Cited

U.S. PATENT DOCUMENTS

| 4,988,142 | A | * | 1/1991 | Chandler et al. | ......... 296/146.2 |
| 5,009,463 | A | * | 4/1991 | Saitoh et al. | ............... 296/210 |
| 5,408,353 | A | * | 4/1995 | Nichols et al. | ............. 359/275 |
| 5,941,596 | A | * | 8/1999 | See | ............................ 296/201 |
| 5,988,729 | A | * | 11/1999 | Klein | .................... 296/107.15 |

FOREIGN PATENT DOCUMENTS

| DE | 19758009 A1 | 7/1998 |
| DE | 19852184 A1 | 5/2000 |
| EP | 0343419 A2 | 11/1989 |

* cited by examiner

Primary Examiner—Jason Morrow
(74) Attorney, Agent, or Firm—Dellett & Walters

(57) ABSTRACT

A transparent roof structure in a vehicle which includes a roof glass (100) which includes a reinforced net layer and a net glass layer (110) which is formed of a first glass layer (114) and a second glass layer (116) formed in an upper and lower surface of the reinforced net layer (112), respectively, a pillar glass (200) which is formed of the net glass layer (110) and is extended from a front end corner of the roof glass (100) in a slanted downward direction, a wind shield (300) which is formed of a transparent glass and is extended from a front end of the roof glass (100) and an inner end of the pillar glass (200), a supporter (500) which includes a holder portion (510) having a glass engaging groove (512) to which a lower portion of the windshield (300) is engaged and an engaging portion (520) which is extended from the holder portion (510).

5 Claims, 7 Drawing Sheets

TRANSPARENT ROOF STRUCTURE IN VEHICLE

BACKGROUND OF THE INVENTION

1. Field of the Invention

The present invention relates to a structure of a vehicle, and in particular to a structure of a vehicle which does not include a front or rear pillar.

2. Description of the Background Art

Generally, a vehicle is formed of a chassis and a body. The chassis is a general term of the parts except for a body of a vehicle and includes a frame, engine, driving force transfer apparatus, suspension apparatus, steering apparatus and brake apparatus. The body is a basic frame of a vehicle. In almost vehicle types such as a sedan, coupe, etc., a monocoque type body in which a roof frame, pillar, main frame, etc. are integrally formed, is adapted.

As shown In FIG. 10, the roof pillar is supported by three pairs of the pillars such as a pillar A, pillar B and pillar C. A wind shield is installed between the pillars A, and a rear window is installed between the pillars C.

Here, since the pillars A and C are formed at the both sides of a driver's seat and at the both sides of the passenger's seat, as shown in FIG. 11, a blind area is formed. Therefore, when a driver turns a vehicle in a certain direction or parks the vehicle, it is impossible to have a wide visual field due to the blind area, so that a vehicle accident may occur for thereby increasing a vehicle accident ratio.

In addition, recently there is a trend for increasing a sporty appearance of a vehicle and decreasing an air resistance. A design for decreasing the width and angle of the pillar A is adapted. In this case, it is impossible to increase a comfort seating feel in a driver's and passenger's seat. Therefore, when a vehicle collision accident occurs or a vehicle overturn accident occurs, it is impossible to satisfy a circular protection system in a driver's and passenger's seat.

SUMMARY OF THE INVENTION

Accordingly, it is a first object of the present invention to provide a transparent roof structure in a vehicle which overcomes the problems encountered in the conventional art.

It is a second object of the present invention to provide a transparent roof structure in a vehicle which is capable of increasing a driving safety by obtaining a wider visual field in a forward and backward direction of a vehicle.

It is a third object of the present invention to provide a transparent roof structure in a vehicle which is capable of satisfying a comfort seating feel and circular protection system in a vehicle by increasing a supporting force of a roof.

It is a fourth object of the present invention to provide a transparent roof structure in a vehicle which is capable of simplifying a process for fabricating a body of a vehicle, enhancing a productivity and implementing an easier maintenance of a roof structure divided into a ring frame.

It is a fifth object of the present invention to provide a transparent roof structure in a vehicle which has good features in durability, heat-resistance, insulation and soundproof.

It is a sixth object of the present invention to provide a transparent roof structure in a vehicle which is capable of implementing a good riding environment by obtaining a natural inner lighting using a natural light.

In order to achieve the above objects, there is provided a transparent roof structure in a vehicle which includes a roof glass which includes a reinforced net layer and a net glass layer which is formed of a first glass layer and a second glass layer formed in an upper and lower surface of the reinforced net layer, respectively, a pillar glass which is formed of the net glass layer and is extended from a front end corner of the roof glass in a slanted downward direction, a wind shield which is formed of a transparent glass and is extended from a front end of the roof glass and an inner end of the pillar glass, a supporter which includes a holder portion having a glass engaging groove to which a lower portion of the wind shield is engaged, an engaging portion which is extended from the holder portion, and a plurality of supporter engaging holes formed in a width direction of the engaging portion, and a ring frame which is installed in each side of the roof glass, the pillar glass, the wind shield and the rear window, respectively.

BRIEF DESCRIPTION OF THE DRAWINGS

The present invention will become better understood with reference to the accompanying drawings which are given only by way of illustration and thus are not limitative of the present invention, wherein.

DETAILED DESCRIPTION OF THE PREFERRED EMBODIMENTS

The preferred embodiments of the present invention will be explained with reference to the accompanying drawings.

Figure 1:
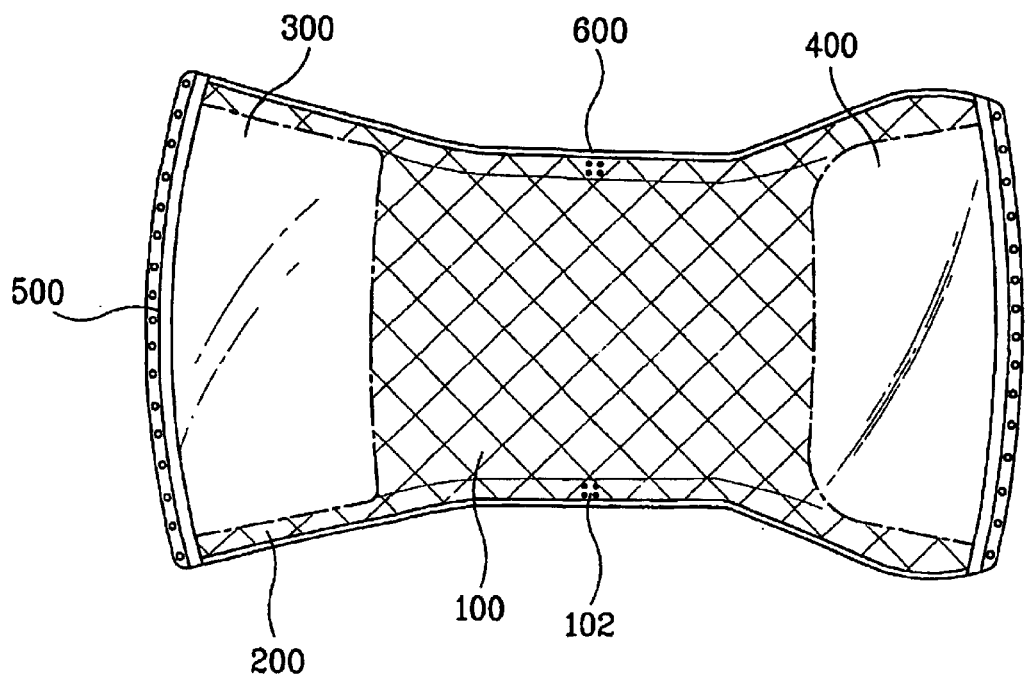
FIG. 1 is a perspective view illustrating a transparent roof structure in a vehicle according to a first embodiment of the present invention.
Figure 2:
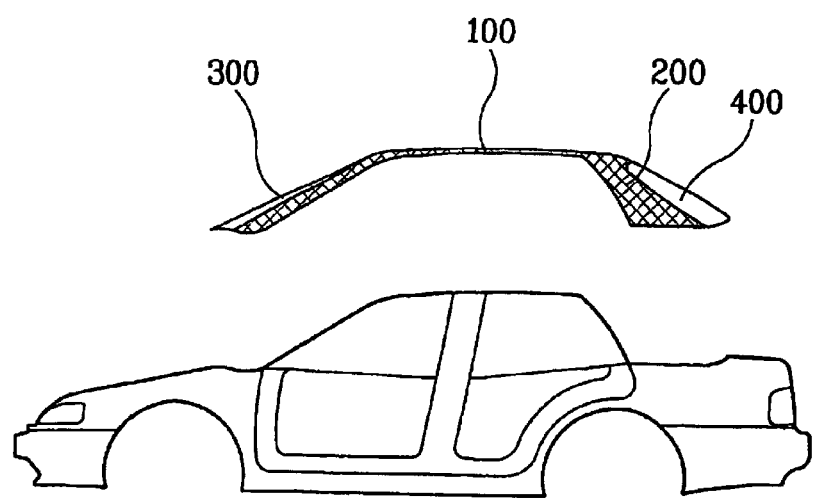
FIG. 2 is a side view illustrating a vehicle having a transparent roof structure according to a first embodiment of the present invention.
Figure 3:
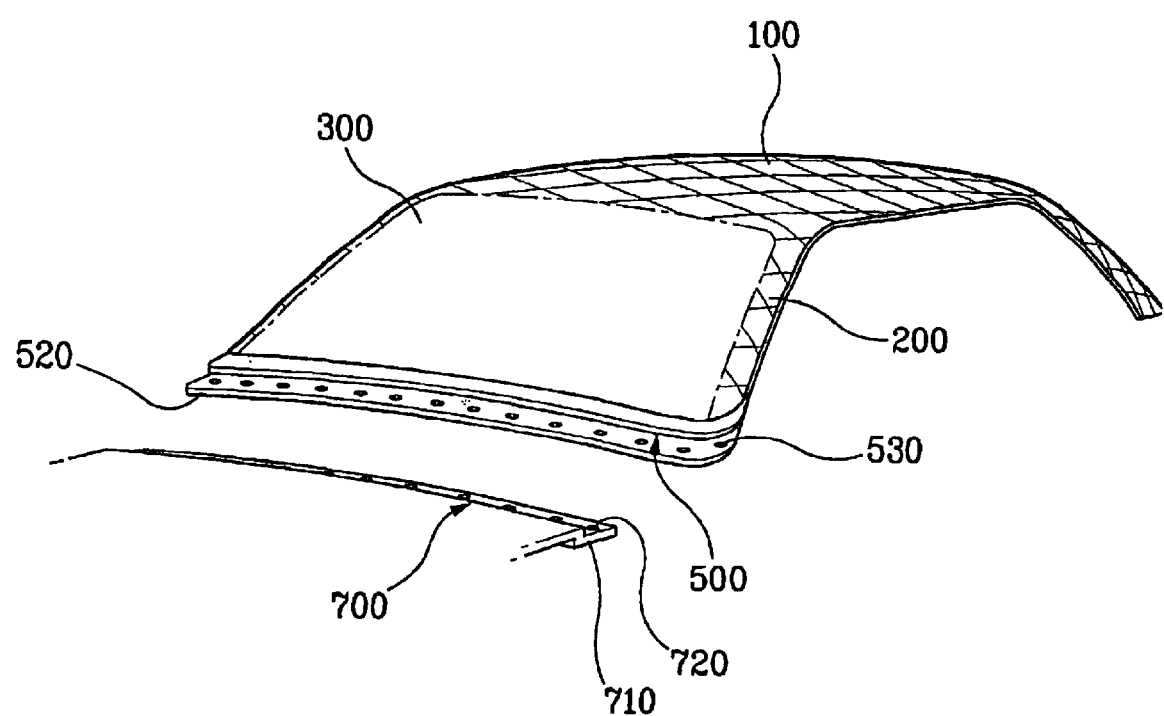
FIG. 3 is a disassembled perspective view illustrating a front engaged state of a transparent roof structure according to a first embodiment of the present invention.
Figure 4:
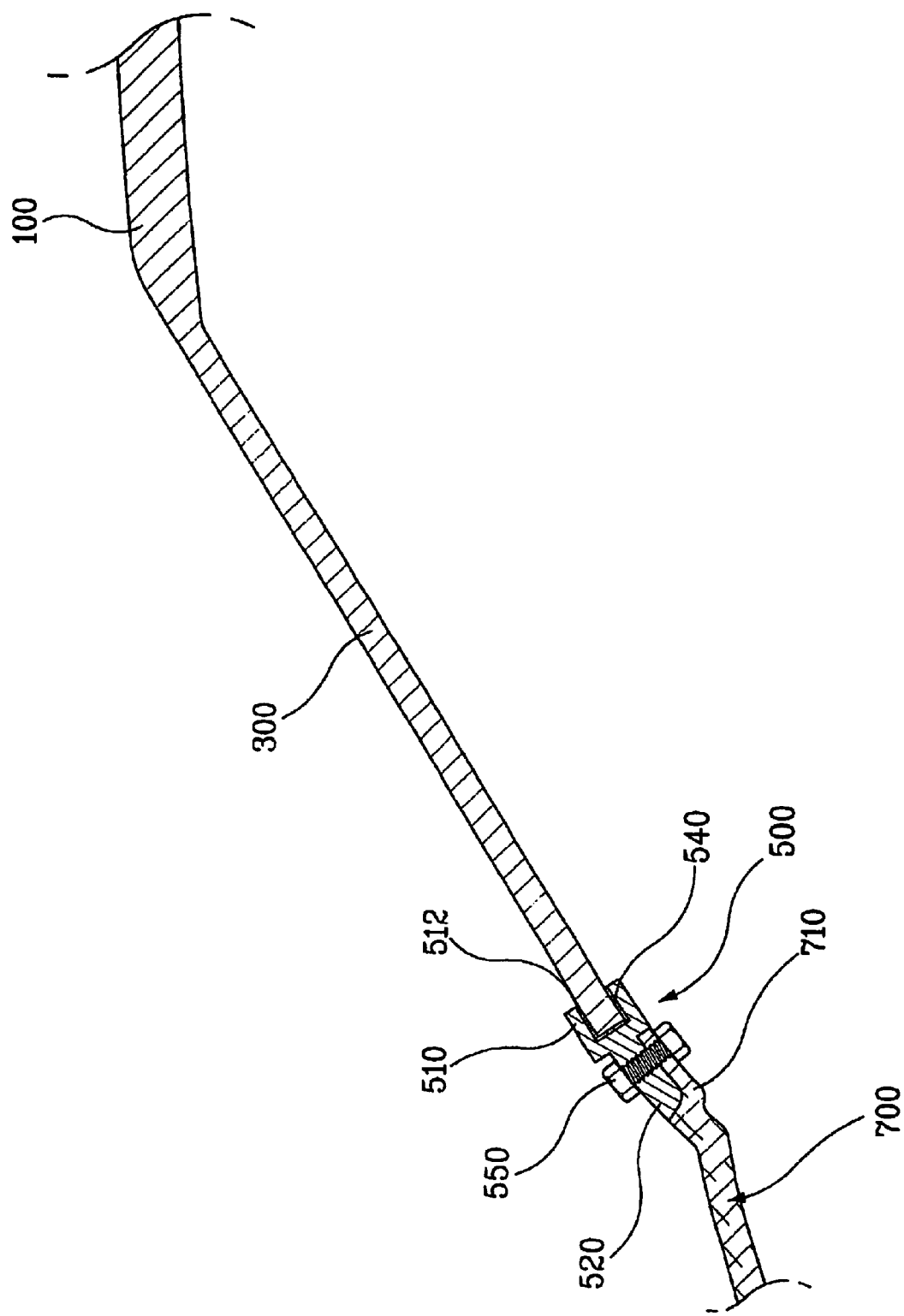
FIG. 4 is a cross-sectional view illustrating a transparent roof structure according to a first embodiment of the present invention.

FIG. 1 is a perspective view illustrating a transparent roof structure in a vehicle according to a first embodiment of the present invention, FIG. 2 is a side view illustrating a vehicle having a transparent roof structure according to a first embodiment of the present invention, FIG. 3 is a disassembled perspective view illustrating a front engaged state of a transparent roof structure according to a first embodiment of the present invention, and FIG. 4 is a cross-sectional view illustrating a transparent roof structure according to a first embodiment of the present invention.

As shown therein, a transparent roof structure of a vehicle according to a first embodiment of the present invention includes a roof glass 100, a pillar glass 200, a wind shield 300, a rear window 400, a supporter 500 and a ring frame 600.

The roof glass 100 is formed in a transparent structure which operates as a roof of a vehicle. The roof glass 100 includes a reinforced net layer 112, and a net glass 110 layer formed of a first glass layer 114 and a second glass layer 116 which are formed on the upper and lower surfaces of the reinforced net layer 112. The reinforced net layer 112 is formed in such a manner that a metallic wire or reinforced fiber wire are crossed at a certain interval like a net, so that the reinforced net layer 112 does not interfere with a driver's visual field and supports the frame of the roof glass 100. In addition, a plurality of engaging holes 102 are formed in the center portion of both side ends of the roof glass 100. An engaged element passes through the engaging holes 102 when engaging with the pillar B.

The first glass layer 114 and the second glass layer 116 are formed of one selected from the group comprising a poly glass, polycarbonate, reinforced plastic, and tempered glass. Preferably, the first glass layer 114 and the second glass layer 116 are formed of a poly glass. The poly glass has 150 times strength compared to the tempered glass and has 40 times strength compared to the acryl and has an excellent mechanical, tension and bending strength and a high heat-resistance and light transmission ratio and is proper for fabricating a curved surface and a roof glass according to the present invention. The roof glass 100 is capable of adding multiple function layers in addition to the net glass layer 112. The layer structure of the roof glass 100 will be described in detail later with reference to FIG. 8.

The pillar glass 200 is formed of a transparent member which is capable of supporting a vertical direction weight of the roof glass 100. The pillar glass 200 is formed of a net glass layer in which a reinforced net layer is formed between the glass layers like the roof glass 100 and is downwardly extended from each corner of the roof glass 100. The pillar glass 200 includes a reinforced net layer for implementing an internal strength and does not interfere with a driver's visual field based on a structure in which a wire is crossed at a certain interval like the roof glass 100.

The wind shield 300 is a transparent glass which is installed in a front surface of a vehicle and is extended from a front end of the roof glass 100 and an inner end of the pillar glass 200. The wind shield 300 does not include a reinforced net layer for obtaining a driver's visual field differently from the roof glass 100 and the pillar glass 200. Namely, the wind shield is formed of only a transparent glass. The wind shield 300 is preferably formed of a poly glass. The wind glass 300 supports a weight of a front side of the roof glass 100.

The rear window 400 is formed of a transparent glass which is installed in a rear side of a vehicle and is extended from a rear end of the roof glass and an inner end of the pillar glass. The rear window 400 does not include a reinforced net layer for obtaining a driver's visual field in a backward direction differently from the roof glass 100 and the pillar glass 200. Namely, the rear window 400 is formed of only a transparent glass. The rear window 400 is preferably formed of a poly glass. The rear window 400 supports a weight of a rear side of the roof glass 100.

The supporter 500 is formed of an engaging support member of the ring frame 600 for engaging a transparent roof structure to a body of a vehicle as an engaging member connected with the ring frame 600. The supporter 500 includes a holder portion 510 having a glass engaging groove 512 to which the lower portions of the window shield 300 and the rear window 400 are engaged, an engaging portion 520 which is extended from the holder portion 510, and a plurality of supporter engaging holes 530 which are formed in a width direction of the engaging portion 520. The supporter 500 is engaged to a lower frame 700 formed in a body of a vehicle by an engaging element 550 engaged to the supporter engaging hole 530 of the engaging portion 520.

The supporter 500 is preferably formed of a metallic material. A packing 540 may be inserted into the glass engaging groove 512 for implementing a sealed state when engaging with the wind shield 300 or the rear window 400. The supporter 500 is engaged with the lower frame 700 formed in a body of a vehicle by engaging element 550 engaged to the supporter engaging hole 530 of the engaging portion 520. The lower frame 700 includes a lower bent portion 710 which is formed in an upper portion in a step shape, and a plurality of engaging holes 720 formed in a width direction of the lower bent portion 710. An engaging member 550 for fixing the supporter 500 to the lower frame 700 may be a screw and bolt. In another embodiment of the present invention, a rivet or welding method may be used.

The ring frame 600 is a reinforcing member which is installed in each side end of the roof glass 100 and the pillar glass 200 and each lower portion of the wind shield 300 and the rear window 400 for thereby reinforcing an external structure of a transparent glass which is a transparent roof structure according to the present invention. The ring frame 600 maintains a basic structure of the roof glass 100 and the pillar glass 200 and protects a lateral end of the same and prevents the roof glass 100 or the pillar glass 200 from being directly contacted with a neighboring frame such as a door frame. The ring frame 600 surrounds the outer portions of the lateral ends of the roof glass 100 and the pillar glass 200 and the outer portions of the lower ends of the wind shield 300 and the rear window 400 for thereby supporting an outer portion of a transparent roof structure in a channel shape. The ring frame 600 is preferably formed of a metallic material for maintaining a basic structure of the transparent roof glass and protecting a side portion from being damaged due to an external impact. A rubber packing 540 may be inserted into the inner side of the ring frame 600 for implementing a sealed state between the metallic ring and glass and increasing a buffering effect. A rubber packing or molding may be additionally provided in both outer sides of the lateral surfaces of the ring frame 600 which surrounds the wind shield 300, the pillar glass 200 and the roof glass 100 for thereby preventing a direct contact with the neighboring frame such as a door frame and implementing a sealed state.

The lower frame 700 includes a lower bent portion 710 which is formed in an upper portion in a step shape, and a plurality of engaging holes 720 formed in a width direction of the lower bent portion 710.

Figure 5:
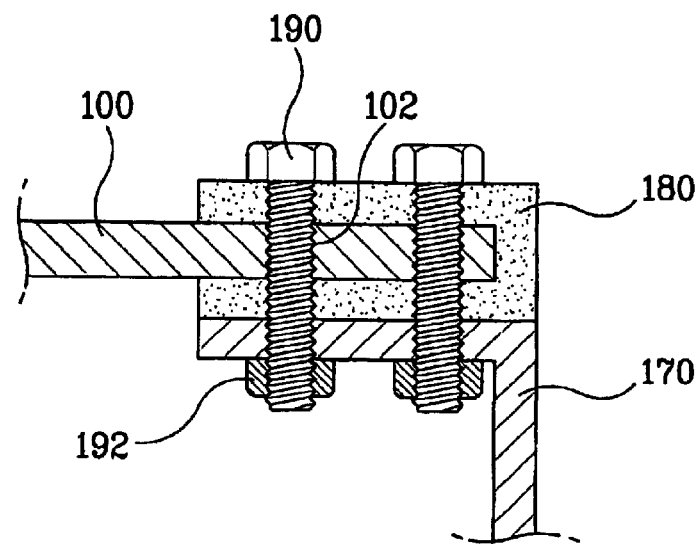
FIG. 5 is a view illustrating the construction of an engaged state of a roof glass and a pillar B according to a first embodiment of the present invention.

FIG. 5 is a view illustrating the engaged state between the roof glass and the pillar B according to a first embodiment of the present invention. As shown therein, the roof glass 100 according to a first embodiment of the present invention is supported in a vertical direction by the pillar glass formed in each corner as well as the pillar B 170(center pillar). A channel shaped molding 180 is installed in the center portion of the lateral ends of the roof glass 100. A certain engaging element such as a bolt 190 and nut 192 may be used for engaging the molding 180, the roof glass 100 and the pillar. B 170. In another embodiment of the present invention, the above elements may be engaged based on a welding method.

Figure 6:
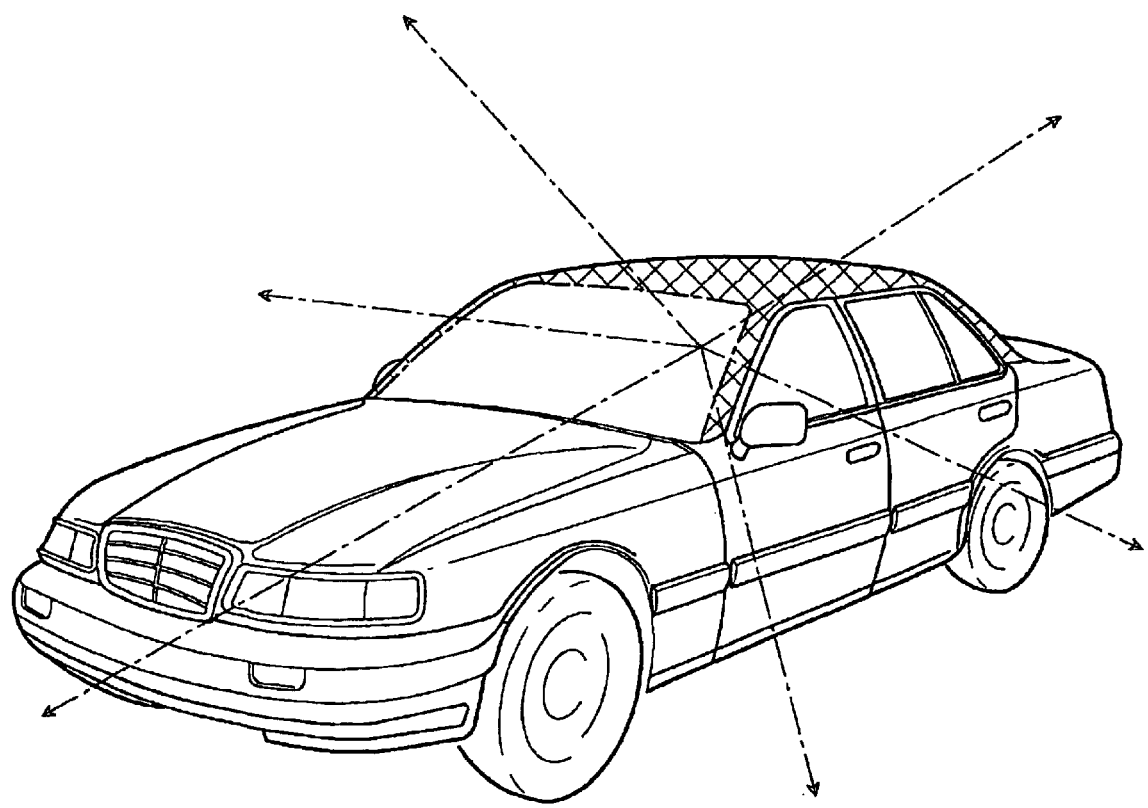
FIG. 6 is a front perspective view illustrating a vehicle having a transparent roof structure according to a first embodiment of the present invention.
Figure 7:
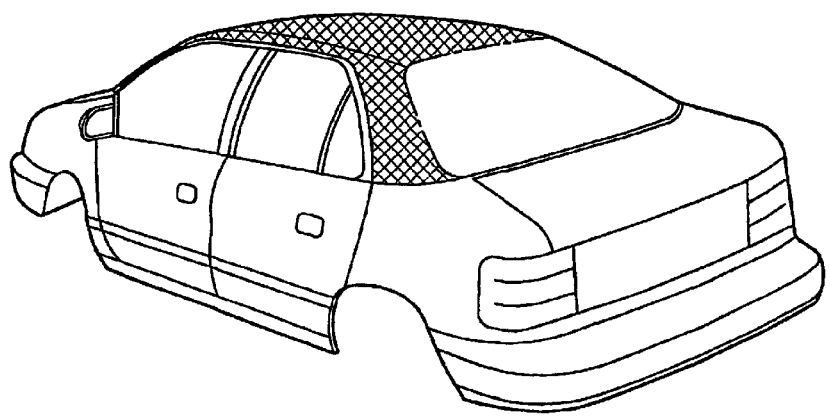
FIG. 7 is a rear perspective view illustrating a vehicle having a transparent roof structure according to a first embodiment of the present invention.

FIG. 6 is a front perspective view illustrating a vehicle having a transparent roof structure according to a first embodiment of the present invention, and FIG. 7 is a rear perspective view illustrating a vehicle having a transparent roof structure according to a first embodiment of the present invention.

As shown therein, in the vehicle having a transparent roof structure according to a first embodiment of the present invention, the wind shield, rear window as well as the roof and pillar portions are formed of a transparent member. Therefore, there is not a blind region which is formed due to a conventional non-transparent pillar and roof, in forward, backward, lateral and upward directions of the vehicle for thereby implementing a wider visual field in the present invention.

Figure 8:
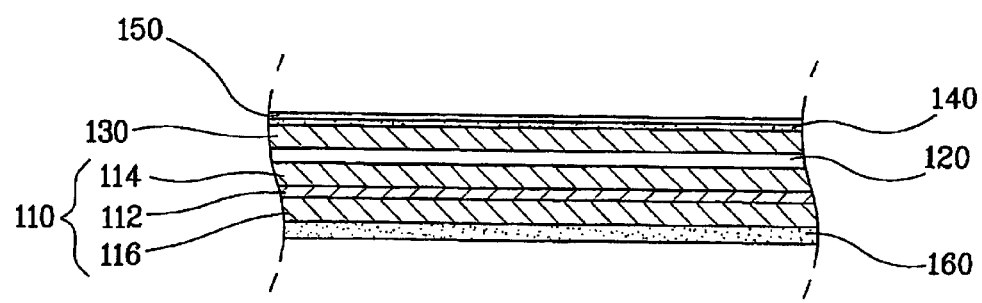
FIG. 8 is a cross-sectional view illustrating a transparent roof structure is implemented based on an application example of the present invention.

FIG. 8 is a cross-sectional view illustrating a transparent roof structure according to an application example of the present invention. As shown therein, the transparent roof structure according to the present invention includes a first glass layer 114, a second glass layer 116, and a net glass layer 110 formed of a reinforced net layer 112 formed between the first glass layer 114 and the second glass layer 116.

The reinforced net layer 112 performs a structure reinforcing role for maintaining a basic object of the transparent rood structure according to the present invention and is formed of a metallic wire or reinforced fiber wire which is not transformed by an external impact and is capable of receiving an external impact.

An air layer 120 and a third glass layer 130 are formed on the upper surface of the first glass layer 114. The air layer 120 enhances a riding comfort feel and performs a bulletproof layer operation based on a buffering effect when an external impact is applied thereto.

A photosensitive glass layer 140 may be additionally formed on the upper surface of the third glass layer 130, and an infrared ray reflection glass layer 150 may be additionally formed on the upper surface of the photosensitive glass layer 140. The photosensitive glass layer 140 is a layer the color of which is changed based on the intensity of light by coating an oxide on the glass. Namely, when a ultraviolet ray is inputted, the layer is changed into a violet color and is darkened. When the ultraviolet ray is not inputted, the color of the layer is changed to the original transparent state. The infrared ray reflection glass layer 150 enhance a warming and cooling efficiency based on the interference of the infrared ray by reflecting light of the sun. The infrared ray reflection glass layer 150 is directed to using an interfering phenomenon of a thin film attached on the surface of the glass and the reflection ration characteristic of the metal which forms the thin film. The infrared ray reflection glass layer 150 may be formed by sputtering a solution which contains a metallic oxide, titanium, tin, etc. on the surface of the glass.

A liquid crystal glass layer 160 may be additionally formed on the lower surface of the second glass layer 116. The liquid crystal glass layer 160 becomes a transparent or non-transparent state based on whether the power is supplied or not and is formed of a glass layer in which liquid crystal molecular are sealed therein. The liquid crystal glass layer 160 is formed by attaching a liquid crystal film to a film having a transparent conductive film and bonding a plate glass to the outer layer. The liquid crystal film prevents scattering of glass.

Figure 9:
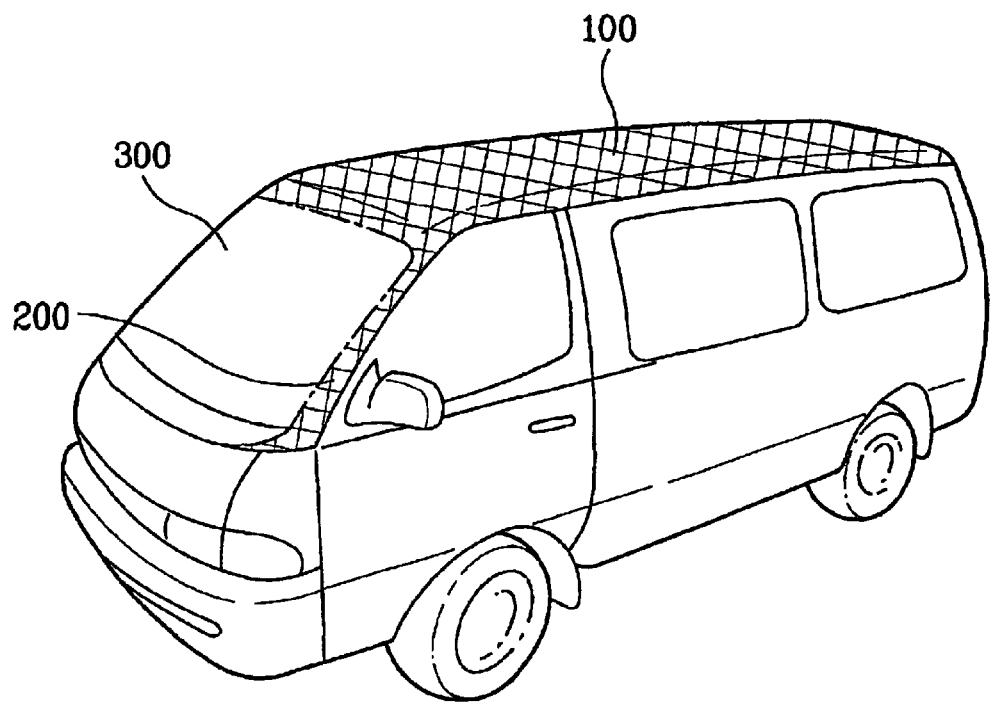
FIG. 9 is a perspective view illustrating a vehicle having a transparent roof structure according to a second embodiment of the present invention.
Figure 10:
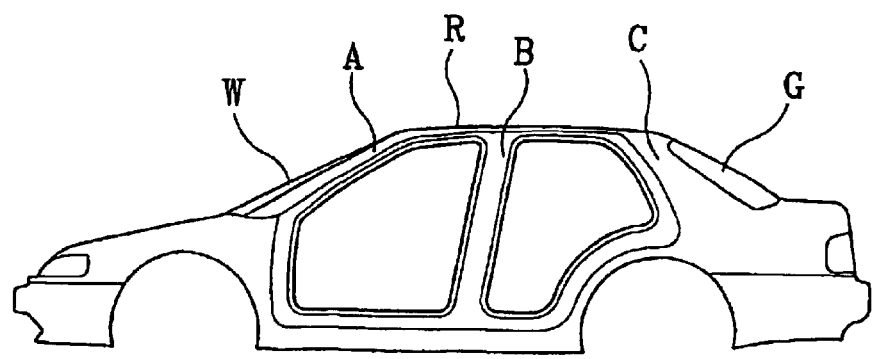
FIG. 10 is a side view illustrating a structure of a conventional vehicle.
Figure 11:
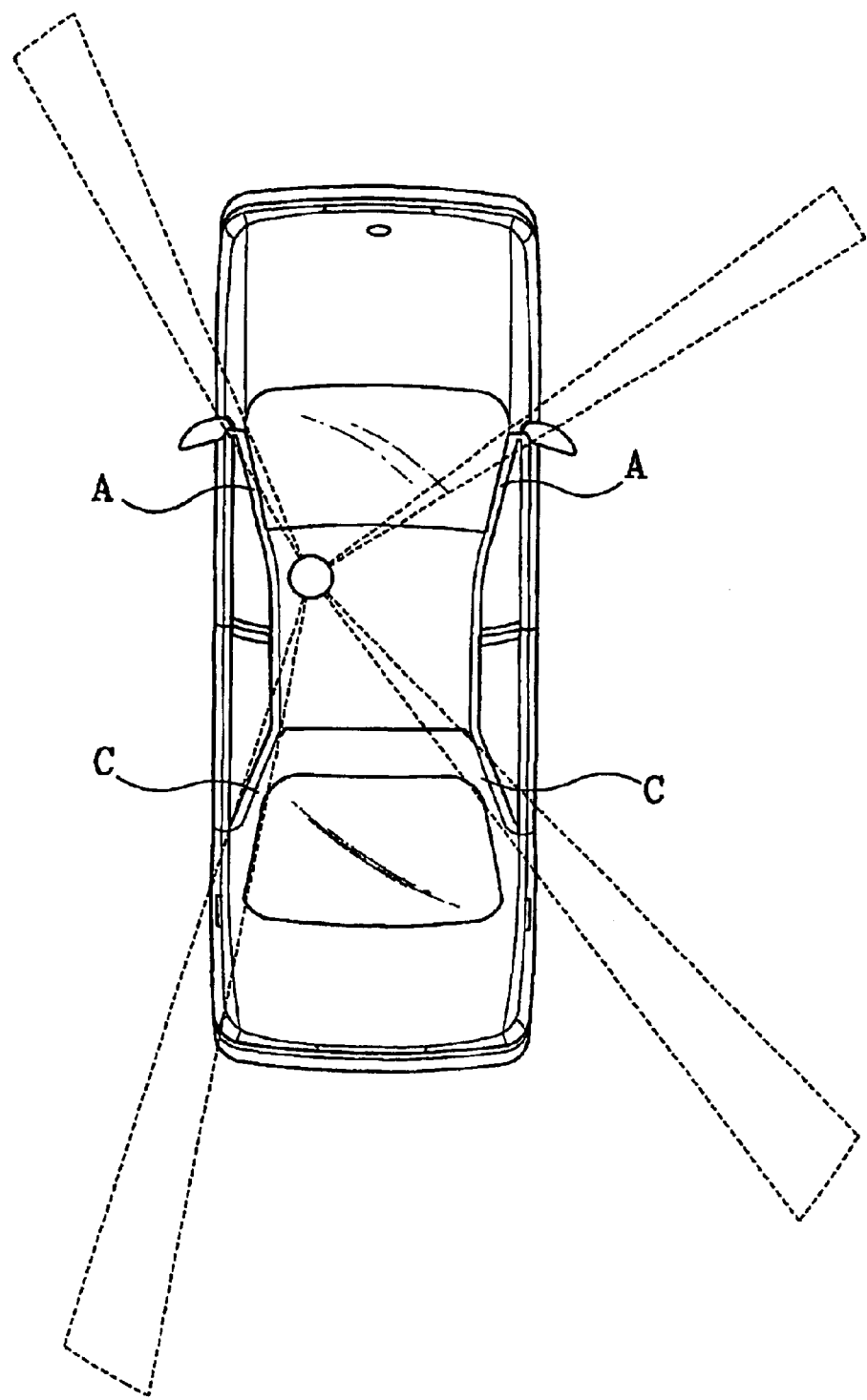
FIG. 11 is a view illustrating a driver's blind area which is formed by a pillar A and a pillar C.

FIG. 9 is a perspective view illustrating a vehicle having a transparent roof structure according to a second embodiment of the present invention. As shown therein, the transparent roof structure according to the present invention may be adapted to a vehicle as well as a bus.

In the case of the bus, the transparent roof structure is formed of a roof glass, a wind shield and a front pillar glass without a rear window. In addition, the roof glass supports a vertical direction weight by the intermediate pillars.

In an application example of the present invention, only the wind shield and the front pillar may be formed of an integral transparent member. Namely, the windshield and front pillar are formed of the poly glass, and the lower and upper portions of the windshield and both lateral ends of the pillar are surrounded by the ring frame, and the upper and lower supporters of the ring frame are engaged with the frame, so that the integral transparent member supports the front portions of the roof and performs the operation of the windshield without a rectangular support.

As described above, in the transparent roof structure of a vehicle according to the present invention, since it is possible to obtain a wider visual field of a driver in the forward, backward and upward directions, it is possible to prevent a traffic accident due to a blind area when driving a vehicle.

In the transparent roof structure according to the present invention, it is possible to satisfy a good riding comfort feel and a circular protection system by distributing a deviated weight support structure and reinforcing a supporting force of a roof.

In the transparent roof structure of the present invention according to the present invention, a vehicle body fabrication process is simplified, and a fabrication process is decreased. Therefore, the fabrication cost of the vehicle is decreased.

In the transparent roof structure of a vehicle according to the present invention, it is possible to decrease the weight of the vehicle for thereby decreasing the consumption of energy and enhancing an economic effect.

In the transparent roof structure of a vehicle according to the present invention, an internal lighting is possible based on a natural light for thereby implementing a good riding comfort feel.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the meets and bounds of the claims, or equivalences of such meets and bounds are therefore intended to be embraced by the appended claims.

What is claimed is:

1. In a vehicle, a transparent roof structure, comprising:
    a roof glass which includes a reinforced net layer and a net glass layer which is formed of a first glass layer and a second glass layer formed in an upper and lower surface of the reinforced net layer, respectively;
    a pillar glass which is formed of the net glass layer and is extended from a front end corner of the roof glass in a slanted downward direction;

a wind shield which is formed of a transparent glass and is extended from a front end of the roof glass and an inner end of the pillar glass;

a supporter which includes a holder portion having a glass engaging groove to which a lower portion of the wind shield is engaged, an engaging portion which is extended from the holder portion, and a plurality of supporter engaging holes formed in a width direction of the engaging portion; and a ring frame which is installed in each side of the roof glass, the pillar glass, the wind shield and the rear window, respectively.

2. The structure of claim 1, wherein said first glass layer, second glass layer and wind shield are formed of one selected from the group comprising a poly glass, reinforced plastic, and tempered glass.

3. The structure of claim 1, wherein an air layer and a third glass layer are formed on an upper surface of the first glass layer of the roof glass.

4. The structure of claim 3, wherein a photosensitive glass layer is formed on an upper surface of the third glass layer, and an infrared ray reflection glass layer is formed on an upper surface of the photosensitive glass layer.

5. The structure of claim 1, wherein a liquid crystal glass layer which is changed into a transparent state or a non-transparent state based on whether a power is supplied or not is formed on a lower surface of the second glass layer.

* * * * *